United States Patent [19]

Matsushima

[11] Patent Number: 5,590,311
[45] Date of Patent: Dec. 31, 1996

[54] SYSTEM AND METHOD FOR EMULATING DISK TRACKS TO MAINTAIN DATA FORMAT COMPATIBILITY

[75] Inventor: Hitoshi Matsushima, Kawasaki, Japan

[73] Assignee: Fujitsu Limited, Japan

[21] Appl. No.: 259,558

[22] Filed: Jun. 14, 1994

Related U.S. Application Data

[63] Continuation of Ser. No. 800,969, Dec. 2, 1991, abandoned.

[30] Foreign Application Priority Data

Nov. 30, 1990 [JP] Japan ................... 2-334167

[51] Int. Cl.$^6$ .................... G06F 13/00; G06F 5/00
[52] U.S. Cl. .................... 395/500; 360/50; 360/48
[58] Field of Search ............... 395/500, 182.03; 360/48, 50, 71

[56] References Cited

U.S. PATENT DOCUMENTS

| | | | |
|---|---|---|---|
| 3,997,876 | 12/1976 | Frush | 369/47 |
| 4,223,390 | 9/1980 | Bowers et al. | 395/182.03 |
| 4,434,487 | 2/1984 | Rubinson et al. | 371/10.2 |
| 4,533,996 | 8/1985 | Hartung et al. | 345/275 |
| 4,680,653 | 7/1987 | Ng et al. | 360/72.2 |
| 4,775,969 | 10/1988 | Osterlund | 369/53 |
| 4,805,090 | 2/1989 | Coogan | 395/275 |
| 4,928,192 | 5/1990 | Bartlett et al. | 360/77.08 |
| 5,018,095 | 5/1991 | Nissimov | 395/425 |
| 5,075,804 | 12/1991 | Deyring | 360/49 |
| 5,113,512 | 5/1992 | Miki et al. | 395/425 |
| 5,210,866 | 5/1993 | Milligan et al. | 395/575 |
| 5,297,124 | 3/1994 | Plotkin et al. | 369/32 |
| 5,301,304 | 4/1994 | Menon | 395/500 |
| 5,313,617 | 5/1994 | Nakano et al. | 395/500 |

FOREIGN PATENT DOCUMENTS

| | | | |
|---|---|---|---|
| 0223611 | 11/1988 | European Pat. Off. | |
| 0347032 | 4/1989 | European Pat. Off. | |
| 62-151259 | 12/1987 | Japan | |
| 62-146895 | 12/1988 | Japan | |
| 63-316121 | 12/1988 | Japan | G06F 3/06 |
| 63-311427 | 12/1988 | Japan | G06F 3/06 |
| 62154528 | 1/1989 | Japan | |
| 64-1187 | 1/1989 | Japan | G11B 27/10 |
| 62205440 | 2/1989 | Japan | |
| 1-49167 | 2/1989 | Japan | G11B 20/10 |
| 62227656 | 3/1989 | Japan | |
| 1-70818 | 3/1989 | Japan | G06F 3/08 |

*Primary Examiner*—Krisna Lim
*Assistant Examiner*—Viet Vu
*Attorney, Agent, or Firm*—Greer, Burns & Crain, Ltd.

[57] ABSTRACT

The invention relates to a disk track emulation system and method, whereby, when a disk device is replaced by a new disk device having a disk track with a data format different from that of the conventional device, a program in a conventional host device can be used as it is, in the same way as in the conventional disk device, without reforming the program. To maintain the a compatibility, using the characteristic that the data format is divided by a unit called a cell having a constant number of bytes, and writing, into a home address area and a count area in the new data format, cell position data with the new data format, and compatible cell position data with respect to the conventional data format in which the compatibility should be maintained.

20 Claims, 13 Drawing Sheets

Fig. 3A

| IM | G | HA | G | R₀ COUNT | G | R₀ DATA |
|---|---|---|---|---|---|---|
| 0 ~ 14 | 15 | 16 | 17 ~ 23 | 24 25 | 26 ~ 32 | 33 ~ N |

| IM | G | HA | G | R₀ COUNT | G | R₀ DATA |
|---|---|---|---|---|---|---|
| 0 ~ 20 | 21 | 22 | 23 ~ 31 | 32 33 | 34 ~ 42 | 43 ~ N |

R₀

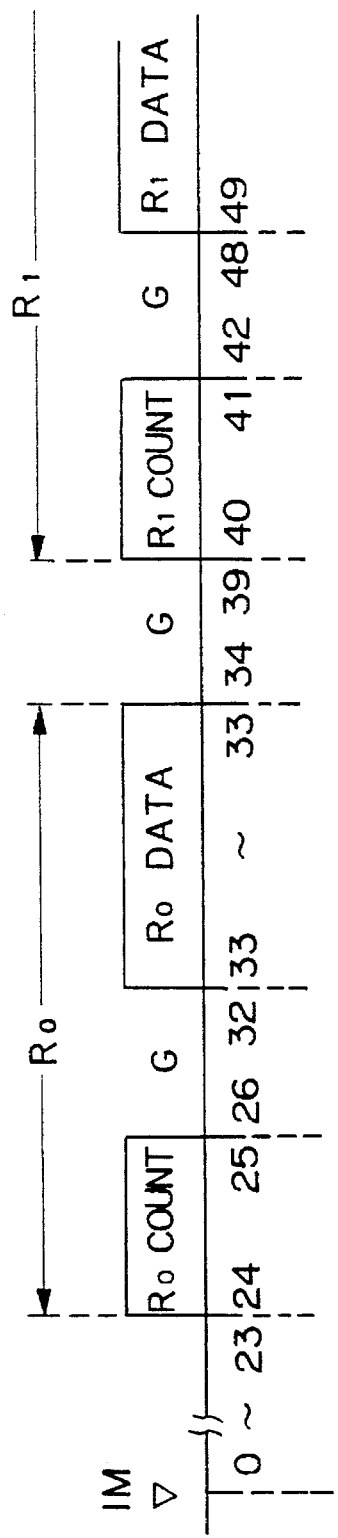
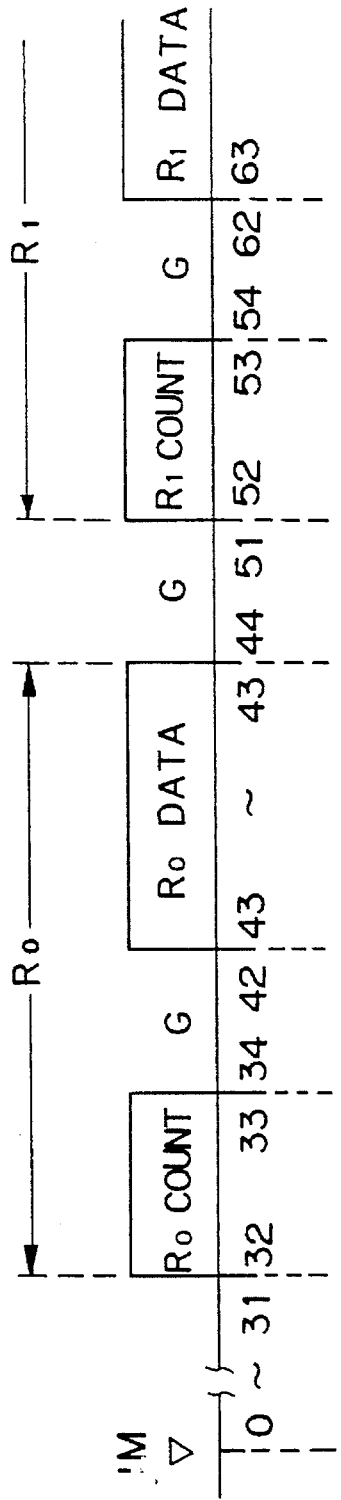

Fig. 5A

IM ▽ | 0~1540 | 1541 | 1542 | 1543 ... 1549 | 1550 ... 1554
- R_n COUNT: 1541, 1542, 1543
- R_n DATA: 1550, ... 1554 ▽ PHYSICAL INDEX

Fig. 5B

IM ▽ | 0~1838 | 1839 | 1840 | 1841 ... 1849 | 1850 ... 1854 ... 1944
- R_n COUNT: 1839, 1840, 1841
- R_n DATA: 1850, ... 1854 ▽ LOGICAL INDEX, 1944 ▽ PHYSICAL INDEX

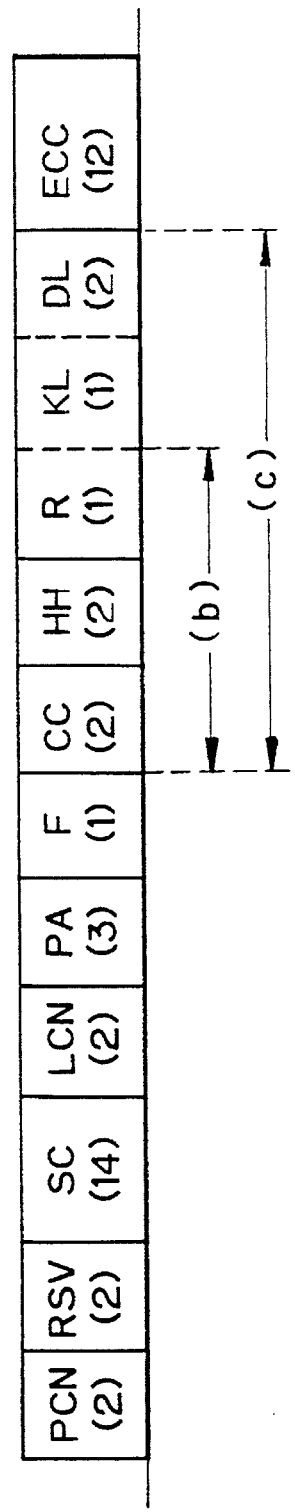

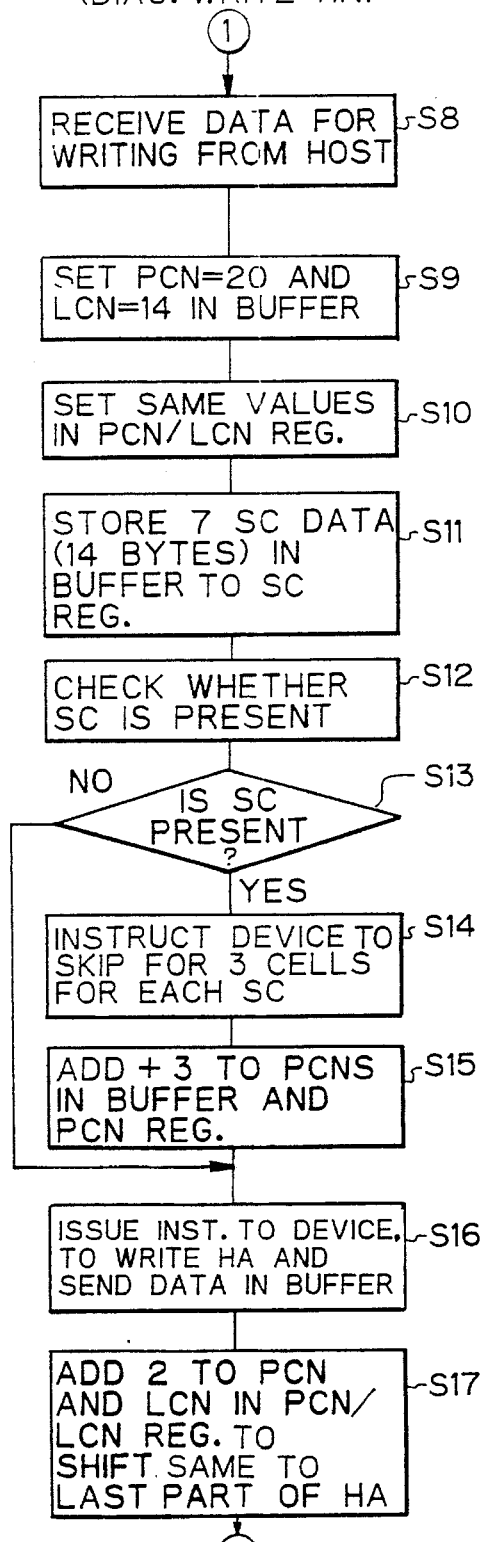
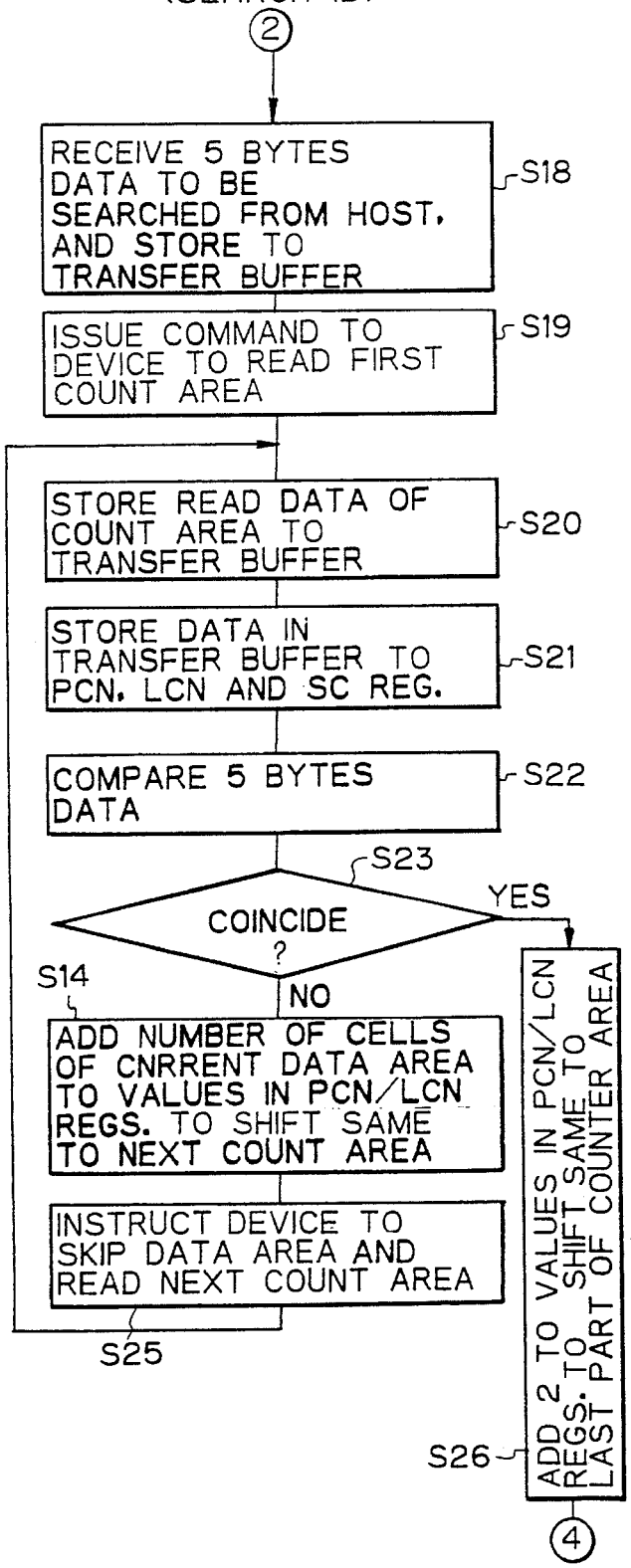

Fig. 14
(PRIOR ART)

| S C | C N | P A | F | C C | H H | Fill | ECC |

Fig. 15
(PRIOR ART)

| S C | C N | P A | F | C C | H H | R | KL | DL | ECC |

SYSTEM AND METHOD FOR EMULATING DISK TRACKS TO MAINTAIN DATA FORMAT COMPATIBILITY

RELATED APPLICATION

This is a continuation of copending application Ser. No. 07/800,969, filed on Dec. 2, 1991 now abandoned.

BACKGROUND OF THE INVENTION (1) Field of the Invention

The present invention relates to a disk track emulation system and method, and in more detail, to a disk track emulation system and method used in a disk system in a computer system (hereinafter, a system including a disk device and a disk control device is referred to as a disk system). In particular, the present invention relates to a disk track emulation system and method capable of maintaining a compatibility between the data format of a conventional system and the data format of a new system when the disk system is replaced by a system with a disk track having a different data format.

(2) Description of the Related Art

For users who are using a conventional disk system, when the disk system is replaced with a higher capacity device, problems such as data compatibility or transfers between the conventional device and the new device become serious.

An important factor in data compatibility or transfer is a track capacity or data transfer speed. Namely, the track capacity or the data transfer speed of the conventional system and the new system may be different.

Recent technological developments have led to a large capacity disk device (such as a magnetic disk device), and inevitably, the capacity per one track has been increased, and further, in new disk devices, the data transfer speed has been increased. Therefore, when the disk devices are replaced, due to the above-mentioned differences in the capacities or the data transfer speeds, the data formats on tracks of the new device and the conventional device may be different, and in such a case, it is impossible to maintain the data compatibility.

Therefore, to meet the needs of users, it has become important to be able to emulate a data format of a conventional disk device on a new disk device. The emulation may be accomplished with a system and method of providing a compatibility (disk track emulation) of a disk track format (data format) of a new device with that of a disk track format (data format) of a conventional device.

Namely, when a conventional disk system including a disk control device and a disk device is replaced by a new disk system, and when the track capacity and the data transfer speed of the new disk system are greater than those of the conventional disk system, obviously, the data formats of disk tracks of the conventional disk system and the new disk system are different. For example, due to the different track capacities, the total track of the conventional disk system is divided into 1554 cells, where each cell has 32 bytes. In the new disk system however, the total track is divided into 1944 cells, each having 34 bytes.

Also, to improve the data transfer speed, the new disk system has a higher disk rotating speed and a different number of cells in a gap between an index mark and a home address, and between the home address and a count area, etc., in comparison with those of the conventional disk system.

When such a new disk system is connected to a conventional host device, the data format of the conventional disk track cannot be used as it is, because it is different from that of the new disk track.

Therefore, conventionally, to connect the new disk system to the host device so as to be workable, it is necessary to prepare a new data conversion program or to reform the user program and so forth used in the host device into a program suitable for the new disk system.

In the above-described conventional art, the following problems exist.

(a) To replace a conventional disk system with a new disk system having a disk track with a different data format, and to work by connecting the new disk system to a host device, the user must prepare a new program for working the new disk system. This preparation of a program, however, takes much time and labor.

Accordingly, if the data format of the disk track is modified, the preparation of a program at each time of modification is time-and labor consuming.

(b) When a conventional disk device is replaced by a new disk device having a disk track with a different data format, no problem arises if the host device is replaced along with the conventional disk system, but this is wasteful of the resources of the user.

(c) When a conventional disk system including a conventional disk device and a conventional disk control device is replaced by a new disk system including a new disk device and having a disk track with a different data format, and when the new disk control device is connected to a host device to operate the new disk system, ideally the program for the host device need not be reformed and the program can be used as if it is used for the conventional disk system, and thus the above-mentioned problems (a) and (b) do not arise.

To realize such a system, however, the following problems must be resolved, and therefore, it has not been conventionally realized.

Namely, when the host device is maintained as the conventional host device, and when the disk control device and the disk device are replaced by a new disk system as mentioned above, it is necessary to carry out the following data processing to operate the new disk system without reforming the program of the host device.

The data transfer between the disk control device and the disk device is controlled under the new data format, but between the disk control device and the host device, it must be controlled under the conventional data format.

Consequently, the data transfer from the host device to the disk control device, and the data transfer from the disk control device to the host device must be carried out in accordance with the conventional data format whereby, from the host device, the new disk system performs as if carrying out the data processing by the conventional data format.

To this end, it is necessary to perform various converting processes in the disk control device, but these converting processes have two problems to be solved.

(a) To realize a compatibility between the host device and the disk control device, the physical record position data, called the cell numbers CN respectively recorded on the records written on the track of the new data format, must be the same values as those in the conventional data format. When the disk control device controls the disk device by the physical track positions, to perform a process such as a skipping of a damaged position on the track, real position data is necessary, but since the data formats are different, it is impossible for the host device to know the real position data in the new disk device without reforming the program.

(b) The total track capacities of the conventional disk system and the new disk system are different. For example, the track capacity of the conventional disk system is 1554 cells, each cell having 32 bytes, whereas the track capacity of the new disk system is 1944 cells, each cell having 34 bytes.

Also, the intervals between records referred to as gaps of the conventional system and the new system are different, and therefore, when data is written up to the physical limit of, for example, 1944 cells, for writing in the new track, it becomes over written in the conventional system and exceeds the limit for writing in accordance with the conventional data format.

Accordingly, data must not be written up to the physical limit for writing in the new track, and the limit for writing must be detected before the data is written up to the physical limit for writing in accordance with the conventional data format.

SUMMARY OF THE INVENTION

An object of the present invention is to resolve the above-described problems, whereby, when a conventional disk device is replaced by a new disk device having a disk track with a data format different from that of the conventional device, a program in a conventional host device can be used as it is in the same way as in the conventional disk device, without reforming the program.

To attain the above object, there is provided, according to the present invention, a disk track emulation system for maintaining compatibility between a first data format and a second data format of a disk track in a disk device. The second data format is different from the first data format. The system includes a host device, the disk device, and a disk control device connected between the host device and the disk device. The disk track consists of a plurality of cells. Each of the cells consists of a certain number of bytes. The host device handles data in accordance with the first data format. The disk control device and the disk device handle data in accordance with the second data format different from the first data format. The disk control device includes a physical cell position data generating unit for generating physical cell position data representing the position of the cell to be accessed in accordance with the second data format, in response to an access operation by one of the host device and the disk device, and a logical cell position data generating unit for generating logical cell position data representing the position of the cell to be accessed in accordance with the first data format. The physical cell position data and the logical cell position data are included in the data on the track in accordance with the second data format.

According to an aspect of the present invention, a track on the disk device includes a home address area for recording home address data for indicating at least the position of the track, and a count area provided for each record in the track for indicating the physical position of the record, the physical cell position data and the logical cell position data being written in the home address area and the count area.

According to another aspect of the present invention, the logical cell position data is not influenced by damaged position data on the disk device.

According to still another aspect of the present invention, during the control of a disk device, a process is carried out by using the physical cell position data, and during a transfer of data to the host device, a process is carried out by using the logical cell position data.

According to still another aspect of the present invention, the system further includes a checking unit for checking damaged position data transferred, as the physical cell position data, from the host device while writing data to a disk track, a writing unit for writing the data, when a damage exists at a data writing position, the data by skipping the writing position on the disk track by a predetermined number of cells, based on the damaged position data, and an adding unit for adding the number of cells to be skipped, to the physical cell position data indicating the current position on the disk track, whereby, the position of the damage is corrected.

The system further includes a take out unit for taking out written-data length data included in the count area sent from the host device, when data is written on the disk track, and an adding unit for adding the number of cells of the data area of this data and the number of cells of a following gap to the logical cell position data; whereby the position of the last logical cell at which data is written is calculated; and as a result, when this exceeds the cell position of a physical index indicating the end of the physical track in the conventional format, the host device is informed of an error and data is not written.

According to still another aspect of the present invention, there is provided a disk track emulation system in a disk control device, for maintaining a compatibility between different data formats, the disk control device being connected between a host device and a disk device. The host device handles data in accordance with a first data format, and the disk control device and the disk device handle data in accordance with a second data format different from the first data format. The data in accordance with the first data format includes, for each track on the disk device, a first home address indicating at least a logical position of the track and a first count area indicating at least a logical position of a record in the track. The data in accordance with the second data format includes, for each track on the disk device, a second home address indicating at least a physical position of the track on the disk device and a second count area indicating at least a physical position of a record in the track. The first data format and the second data format are divided into a plurality of units of cells. Each of the units consists of a predetermined number of bytes. The second data format further includes physical cell position data indicating the physical cell position on the disk device to be accessed, and a logical cell position data used in the host device and indicating the logical cell position of the disk device to be accessed and corresponding to the physical cell position.

BRIEF DESCRIPTION OF THE DRAWINGS

The above objects and features of the present invention will be more apparent from the following description of the preferred embodiments, with reference to the accompanying drawings wherein:

FIG. 2 to FIG. 11 are diagrams showing an embodiment of the present invention; wherein FIG. 2 is a block diagram of a magnetic disk system;

FIGS. 3A and 3B are explanatory diagrams of a track data format of the beginning part of a disk track;

FIGS. 4A and 4B are explanatory diagrams of a data format of a middle part of the disk track;

FIGS. 5A and 5B are explanatory diagrams of a data format of the end part of the disk track;

FIGS. 6A and 6B are explanatory diagrams of home address formats in accordance with a conventional format and a new format, respectively, FIGS. 7A and 7B are explanatory diagrams of count area formats in accordance with a conventional format and a new format, respectively, FIG. 8 is a process flowchart explaining an initialization;

FIG. 9 is a process flowchart explaining a process in accordance with an instruction "DIAGNOSTIC WRITE HA";

FIG. 10 is a process flowchart explaining a process in accordance with an instruction "SEARCH ID";

FIG. 11 is a process flowchart explaining a process in accordance with an instruction "WRITE $R_0$" or "WRITE CKD"; and FIG. 12 to FIG. 15 are diagrams showing a conventional example, wherein FIG. 12 is a block diagram of a disk system;

FIG. 13 is an explanatory diagram of the data format of a disk track;

FIG. 14 is an explanatory diagram of a home address format; and

FIG. 15 is an explanatory diagram of a counter area format.

DESCRIPTION OF THE PREFERRED EMBODIMENT

For better understanding of the present invention, the conventional art is first described with reference to FIGS. 12 to 15.

Figure 12:
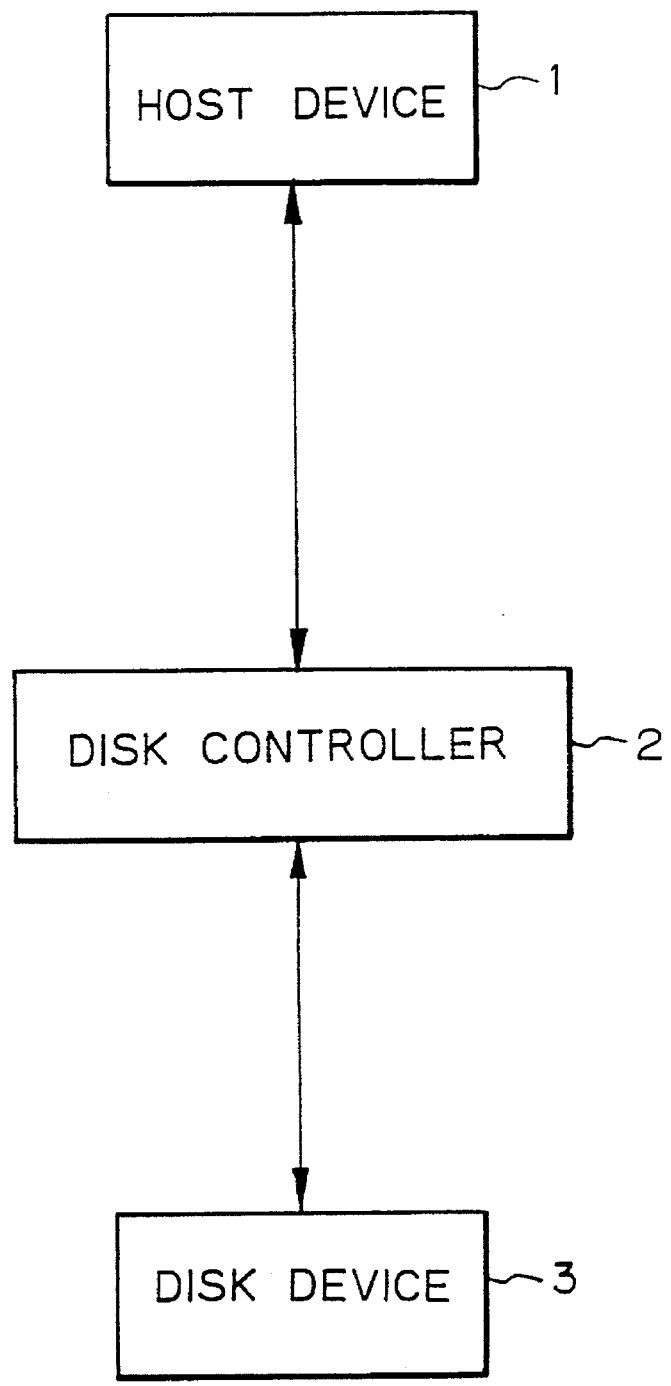
Figure 13:
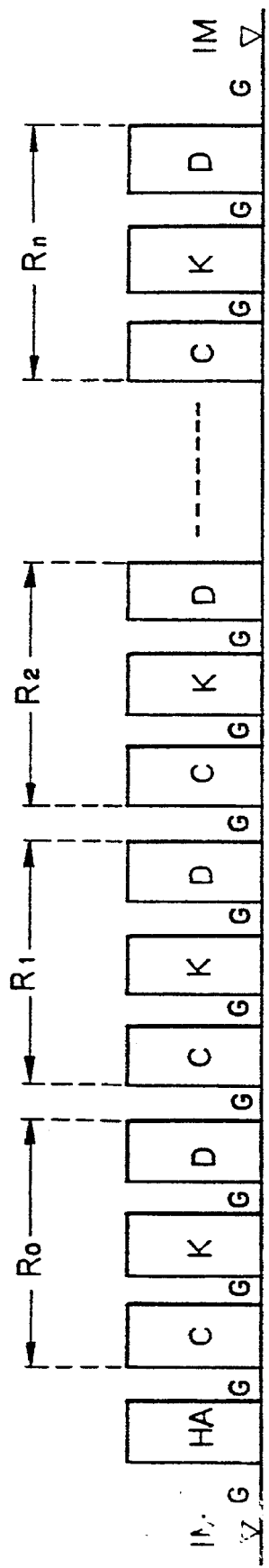

FIG. 12 to FIG. 15 are diagrams showing a conventional example, in which FIG. 12 is a block diagram of a disk system, FIG. 13 is an explanatory diagram of a data format of a disk track, FIG. 14 is an explanatory diagram of a format of a home address, and FIG. 15 is an explanatory diagram of a format of a count area.

The figures show a host device 1, a disk control device 2, and a disk device 3. IM represents an index mark (Index Mark), G a gap, HA a home address, C a count area, K a key area, D a data area, $R_0$ a track description record, $R_1$–$R_n$ data records, SC a skip control, CN a cell number, PA a physical address, F a flag, CC a cylinder number, HH a head number, Fill a fill data, ECC an error correction code, R a record number, KL a key number, and DL a data length.

Conventionally, in a computer system, a disk system such as a magnetic disk system and so forth, as shown in FIG. 12, is used for example, as an auxiliary storage device.

In this disk system, when a command is sent from the host device 1 to the disk control device 2, the disk control device 2 controls the disk device 3 to write data sent from the host device 1 on a disk device 3 or to read data from the disk device 3 and transfer same to the host device 1.

In this case, the conventional data format of the disk track into which the data is written is for example, as shown in FIG. 13.

The data to be written to the disk device 3 is written on the tracks on the surface of the disk device 3. The disk tracks are cut by index marks IM recorded at the beginning and at the end of each track.

A gap G follows the index mark IM indicating the beginning of a track, and a home address HA follows the gap G. Further, the count area C, the key area K, and the data area D are arranged, respectively, including the gap G therebetween. The first set of C, K and D followed by the home address HA is called the track description record $R_0$. The sets of the C, K, and D followed by the track description record $R_0$ are respectively referred to as data records $R_1$ to $R_n$. A gap G is inserted between the last data record R and the index mark IM indicating the end of the track.

Namely, one track consists of the home address HA, the track description record $R_0$ and a plurality of data records $R_1$ to $R_n$. Each record other than the home address HA consists of the count area C, the key area K, and the data area D. In another conventional example, the key area K may be omitted.

The track description record $R_0$ is a record having a different characteristic from the data records $R_1$ to $R_n$. For example, an address and so forth of an alternate track is written on the description record $R_0$.

The format of the conventional home address HA is as shown in FIG. 14. One home address HA is included in each track, to represent the physical position of the track or the state of the track.

Practically, as shown in FIG. 14, one home address consists of a skip control SC, a cell number CN, a physical address PA, a flag F, a cylinder number CC, a head number HH, a fill data Fill, and an error correction code ECC.

The skip control SC helps isolate defective portions of the disk device from use. For example, if a track has sustained damage or some performance degrading defect (for example, a defect on the magnetic medium), the entire track is not deemed as unusable, but instead, skip control SC data indicates which portions of the track are to be avoided. Thus, reading or writing of data may still be performed on the damaged track while defective portions are avoided. The skip control SC data indicates the position of the defective portion of the track. Usually, two bytes are used to record each of seven data in the sequence of SC1, SC2, . . . , and SC7. Each two bytes of the skip control SCn, where n is 1, 2, . . . , or 7, represents the distance from the index mark IM indicating the beginning of the track to the center of the n-th defective portion is expressed by the number of cells.

The cell number CN represents the cell number of a cell just before the cell at which a synchronization byte (Sync Byte) of the home address HA exists.

The physical address PA represents a physical cylinder number and a head number of the track. The flag F represents the state or the attribute of the track.

The format of the count area C is as shown in FIG. 15. The count area C includes, first, a skip control SC, then a cell number CN, and further, a physical address PA, a flag F, a cylinder number CC, a head number HH, a record number R, a key length KL, a data length DL, and an error correction code ECC.

Data is recorded on the disk in accordance with the above-mentioned data format of the disk track. The disk track is divided into cells, each of which is a unit with a certain number of bytes, for example, 32 bytes.

The cell number CN area, provided in the above-mentioned home address, and the count area, contain a cell number which is counted from an index mark IM indicating the beginning of a track.

It is assumed that a user using a disk system replaces the conventional disk system, including the disk control unit 2 and the disk unit 3 shown in FIG. 12, by a new disk system. In this case, it is also assumed that the track capacity of the new disk system is larger than that of the conventional disk system, and that the data transfer speed in the new disk system is higher than that in the conventional disk system.

In this case, naturally, the data formats of the disk tracks of the conventional disk system and the new disk system are different.

For example, due to the difference of the track capacities, the conventional disk system has a track divided by cells, of which is a unit of 32 bytes, and one track consists of 1554 cells, but the new disk system has a track divided by cells, each of which is a unit of 34 bytes, and one track consists of 1944 cells.

Also, to improve the data transfer speed, the new disk system has a higher disk rotating speed and a different number of cells in the gap G, in comparison with the conventional disk system.

When such a new disk system is connected to a conventional host device (see FIG. 12), the problems arise as described in "(2) Description of the Related Art", and to solve these problems in the conventional art, the present invention is provided. Now, an embodiment of the present invention will be described in detail.

Figure 1:
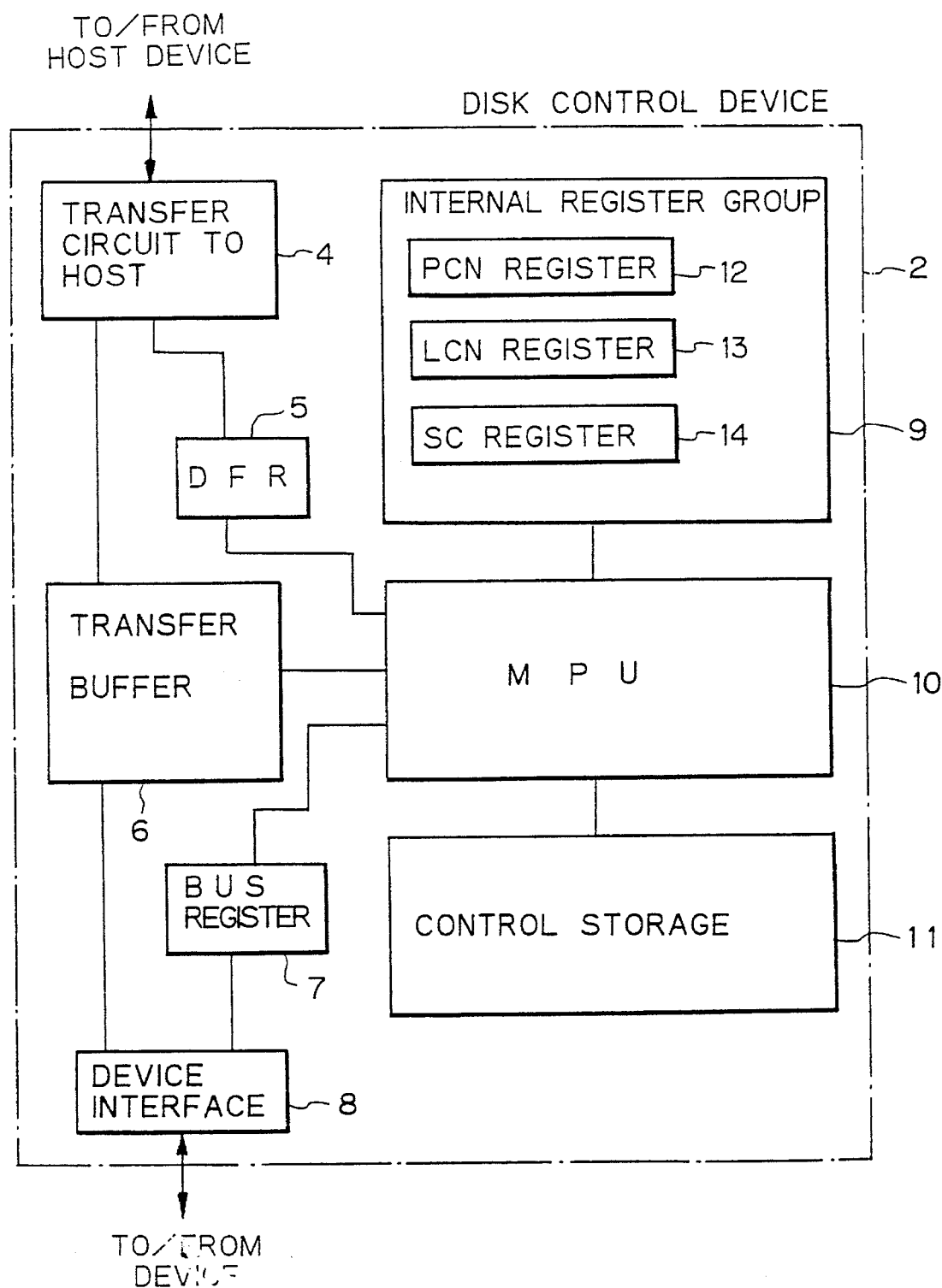
FIG. 1 is a principal diagram of the present invention.

FIG. 1 is a principal diagram of the present invention. The invention includes a disk control device 2, a transfer circuit 4 to transfer data between the disk control device and a host device, a data frame register 5 (DFR), a transfer buffer 6, a bus register 7, a device interface 8, an internal register group 9, an MPU 10, a control storage 11, a physical cell number register 12 (PCN register), a logical cell number register 13 (LCN register), and a skip control register 14 (SC register).

To attain the above object, according to the present invention, there is provided the following system and method.

(1) A disk track emulation system and method maintains compatibility between differing data formats inherent to different disk tracks of a newly installed disk device and prior, conventional disk device. Disk track emulation includes a new disk device, having a data format different from the data format of the prior disk device, and a disk control device 2 for controlling the new disk device. Such a system for storing data uses a data unit called a "cell." Each cell has the same number of bytes. The new data format includes areas for cell position data with respect to the new data format and compatible cell position data with respect to the conventional data format. Both the old and new cell position data are written to a home address area and a count area in the new data format. The disk control device 2 has access to the new cell position data, and the host device has access to the old cell position data. Thus, the compatibility between the data formats is maintained.

(2) In the above-described constitution (1), a physical cell position data (PCN) is used as the cell position data of the new data format, and a logical cell position data (LCN) is used as the compatible cell position data. The logical cell position data is determined in accordance with the conventional data format. Recording defects in the disk device do not affect logical cell position data. The disk control device 2 interprets the logical cell position data and accesses a disk device 3 using the physical cell position data (PCN). Data is transferred to and from the host device using the logical cell position data.

(3) In the above-described constitution (2), while the host device is writing to the disk device, damaged position data (SC) corresponding to the physical cell position data is checked. When a defect exists at a data writing position, the data is written by skipping the defective writing position on the disk track by a predetermined number of cells. The number of cells to skip is based on the damaged position data (SC). The number of cells for said skipping is then added to the physical cell position data (PCN) indicating the current position on the disk track, whereby the damaged position is avoided.

(4) In the above-described constitution (2) or (3), when data is written on the disk track, written-data length data included in the count area sent from the host device is taken out. Then, the number of cells of the data area of this data and the number of cells of a following gap is added to the logical cell position data (LCN). The sum is the position of the last logical cell when the data is written. When the sum exceeds the cell position of a physical index indicating the end of the physical track in the conventional format, the host device is informed of an error.

Due to the above constitution, the present invention has the following mode of operation.

(A) The mode of operation by the constitutions (1) and (2).

The disk control device 2 controls the device (disk device) in accordance with a command from the host device, and carries out a disk track emulation for the host device. This process is carried out by the MPU 10 by taking out programs and so forth stored in the control storage 11.

When data is written to a disk track, first a home address is written, and then data records are written sequentially through the gaps.

At the time of the above-mentioned data writing, data transferred from the host device is first stored in the transfer buffer 6, and the MPU 10 sets a physical position data (PCN) and a logical position data (LCN) in the transfer buffer 6.

Simultaneously, the afore-mentioned data (PCN, LCN) are stored in the physical cell position register 12 and the logical cell position register 13 in the internal register group 9, and are assumed to be a data write-in current position of the disk track.

Thereafter, the data in the transfer buffer 6 is sent to the device to be written to a write-in position of the target track. When the write-in is finished, the preparation for the next writing operation is effected by adding the number of cells to which data is written to the above-mentioned each data (PCN, LCN).

In this case, as the physical cell position data, the physical cell position data in the data format of the disk track is used; and as the logical cell position data (LCN), the cell position data (the position calculated in accordance with the cell data of the conventional data format) to be emulated is used.

The value of the logical cell position data (LCN) is not changed even when there is a damaged position, and this data (LCN) is used as the compatible cell position data for the host device. Accordingly, the compatibility of the data format of the disk track can be maintained for the host device, and thus a disk track emulation becomes possible.

Figure 2:
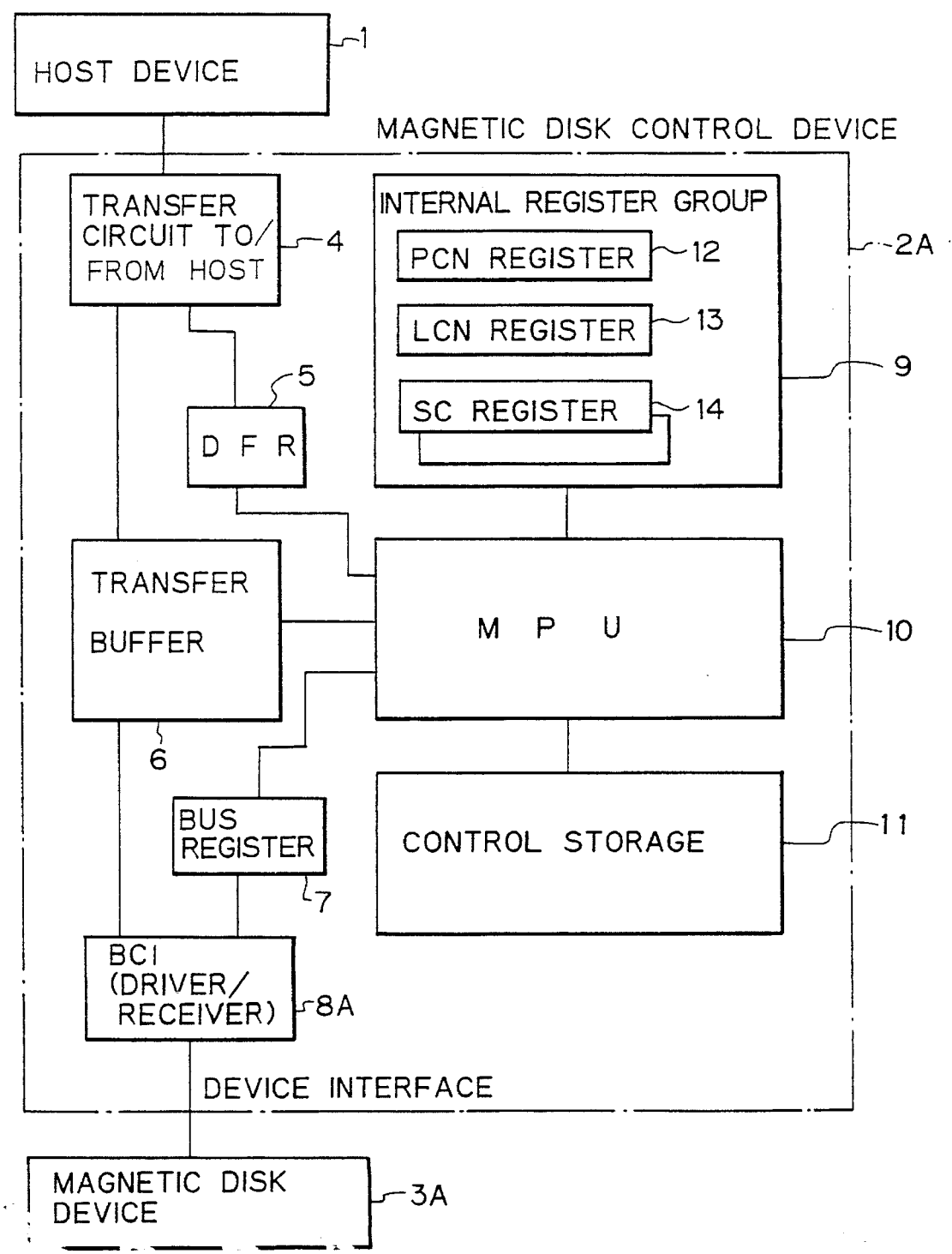
Figure 8:
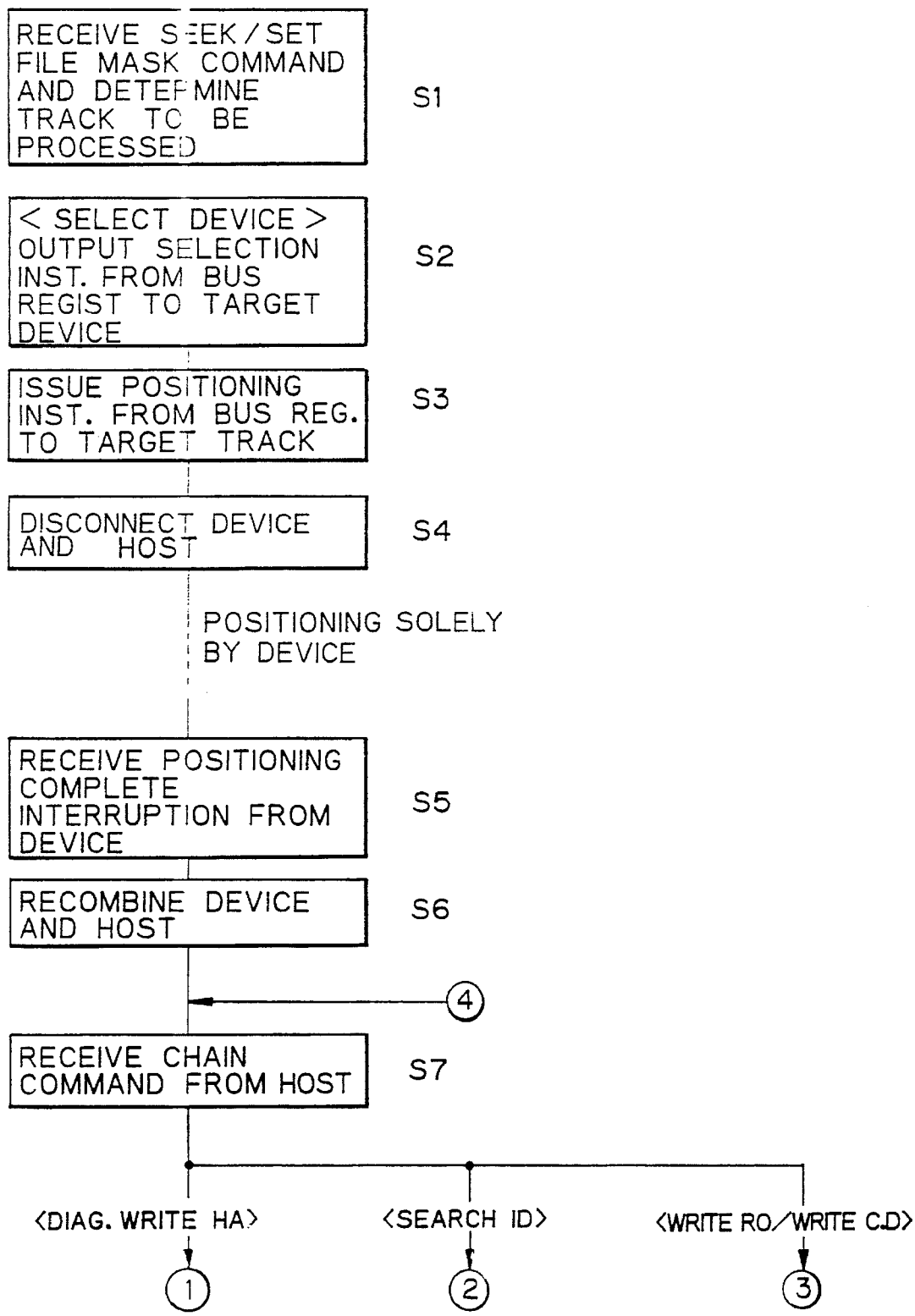

FIG. 2 to FIG. 7 are diagrams showing an embodiment of the present invention, wherein FIG. 2 is a block diagram of a magnetic disk system, FIGS. 3A and 3B are explanatory diagrams of the beginnings of a conventional data format and a new data format of a disk track, FIGS. 4A and 4B are explanatory diagrams of the middle portions of the conventional data format and the new data format, FIG. 5A and FIG. 5B are explanatory diagrams of the end portions of the conventional data format and the new data format. FIG. 6A and FIG. 6B are explanatory diagrams of home address formats in the conventional and new data formats, FIG. 7A and FIG. 7B are explanatory diagrams of count area formats in the conventional and new data formats, and FIG. 8 to FIG. 11 are diagrams showing process flowcharts.

In the figures, the same symbols as those in FIG. 1 and FIG. 12 represent the same parts. Also, 2A represents a magnetic disk control device, 3A a magnetic disk device, and 8A a bidirectional control interface (BCI).

The magnetic disk control device 2A is provided with a transfer circuit 4 for transferring data between the host device 1 and the disk control device 2A. The disk control device 2A further includes a data frame register (DFR) 5, a transfer buffer 6, a bus register (BUS register) 7, a bidirectional control interface (BCI) 8A, an internal register group 9, an MPU 10, and a control storage 11.

The internal control register group 9 includes a physical cell number register (PCN register) 12, a logical cell number register (LCN register) 13, and a skip control register (SC register) 14.

The transfer circuit 4 transfers data or process commands between the magnetic disk control device 2A and the host device 1. The data frame register 5 receives commands from the host device 1 via the transfer circuit 4 (the MPU 10 receives commands from the data frame register 5). The transfer buffer 6 is a data storing buffer used for data transfers between the host device 1 and the magnetic disk device 3A (the MPU 10 can read or write data in or from this buffer).

The bus register 7 is a register used by the MPU 10 to issue a process command to the magnetic disk device 3A, and to acknowledge a response from the magnetic disk device 3A.

The control storage 11 stores programs, various data and so forth used by the magnetic disk control device 2A; for example, the data of the data formats of the conventional and the new disk tracks (such as the number of cells in the recording area or the gap).

Next, the data format of the disk track is described with reference to FIGS. 3A, 3B, 4A, 4B, 5A, and 5B. Note, in these figures the data format of the disk track in the conventional magnetic disk system (A) and the data format of the disk track in the new disk system (B) are comparatively shown. Also, in this example, a data format without a key area is used in which the numerals in the figures represent cell numbers which are the same as the number of cells counted from a start point, i.e., an index mark IM indicating the beginning point of a track.

In the data format of the disk track in the conventional magnetic disk system, it is assumed that the full circumferential track is divided into cells each having a unit of 32 bytes (one cell =32 bytes), and one circumference constitutes 1554 cells. By contrast, in the data format of the disk track in the new magnetic disk system, it is assumed that the full circumferential track is divided into cells each having a unit of 34 bytes (one cell =34 bytes), and one circumference constitutes 1944 cells. Each data format in this case is as shown in FIG. 3 to FIG. 5. FIG. 3 shows mainly a home address HA; FIG. 4 a record $R_0$ and FIG. 5 the last record $P_n$ in the track.

In the conventional data format, the gap between the index mark IM including the beginning of the track and the home address HA is between the cell numbers 0 and 14 (the number of cells =15), and the home address HA is between the cell numbers 15 and 16 (the number of cells is 2).

The gap G followed by the home address HA is between the cell numbers 17 and 23 (the number of cells =7), and the count area ($R_0$ count) in the record $R_0$ is between the cell numbers 24 and 25 (the number of cells =2). The other areas are constituted as illustrated.

In contrast, in the new data format, the gap between the index mark IM indicating the beginning of the track and the home address HA is between the cell numbers 0 and 20 (the number of cells =21), and the home address HA is between the cell numbers 21 and 22 (the number of cells is 2).

The gap G followed by the home address HA is between the cell numbers 23 and 31 (the number of cells =8), and the count area ($R_0$ count) in the record $R_0$ is between the cell numbers 32 and 33 (the number of cells =2). The other areas are constituted as illustrated.

The formats of the home address HA and the count area are described with reference to FIG. 7A, FIG. 7B, FIG. 8A and FIG. 8B. Note, in the figures the diagrams 7A and 8A show the conventional formats, and the diagrams FIG. 7B and FIG. 8B comparatively show formats according to the present invention. Also, the numerals in the brackets represent the number of bytes.

First, the conventional format of the home address HA is shown in FIG. 6A. The home address HA in the conventional format includes a skip control SC (14 bytes), a cell number CN (2 bytes), a physical address PA (3 bytes), a flag F (1 byte), a cylinder number CC (2 bytes), a head number HH (2 bytes), a fill data (4 bytes), and an error correction code ECC (12 bytes). These elements are sequentially arranged.

Note that the skip control SC is an area for recording damaged position data, and the fill data Fill is an area for recording dummy embedding data.

In contrast, in the format of the home address HA according to the present invention, a physical cell number PCN (2 bytes), a reserve (unused) Rsv (2 bytes), a skip control SC (14 bytes), a logical cell number LCN (2 bytes), a physical address PA (3 bytes), a flag F (1 byte), a cylinder number CC (2 bytes), a head number HH (2 bytes), fill data Fill (4 bytes), and an error correction code ECC (12 bytes) are sequentially arranged.

The conventional format of the count area is shown in FIG. 7A. The conventional format includes a skip control SC (14 bytes), a cell number CN (2 bytes), a physical address PA (3 bytes), a flag F (1 byte), a cylinder number CC (2 bytes), a head number HH (2 bytes), a record number R (1 byte), a key length KL (1 byte), a data length DL (2 bytes), and an error correction code ECC (12 bytes). These elements are sequentially arranged in the count area.

The format according to the present invention is shown in FIG. 7B. In contrast to the conventional format, the count area of the present invention includes a physical cell number PCN (2 bytes), a reserve (unused) Rsv (2 bytes), a skip control SC (14 bytes), a logical cell number LCN (2 bytes), a physical address PA (3 bytes), a flag F (1 byte), a cylinder number CC (2 bytes), a head number HH (2 bytes), a record number R (1 byte), a key length KL (1 byte), a data length DL (2 bytes), and an error correction code ECC (12 bytes). These elements are sequentially arranged in the count area.

According to the present invention, when a disk system (a magnetic disk system in this embodiment) in a computer system is changed from a conventional system to a new system, disk track emulation makes the change possible without reforming programs and so forth for the host device. The host device uses the new system in the same way as the conventional system because compatibility is maintained between the conventional data format and the new data format.

To maintain the compatibility, the new formats of the home address and the count area are determined as shown in FIG. 6B and FIG. 7B. In each of these formats, the different areas between the conventional format and the format of the present invention are the physical cell number PCN and the logical cell number LCN. Note, since the reserve Rsv is unused it does not relate to this difference.

When the new disk system is connected to the conventional host device, in the example of FIG. 2, the data processing between the magnetic disk control device 2A and the magnetic disk device 3A is carried out in accordance with the new data formats shown in FIG. 6B and FIG. 7B.

The data processing between the host device 1 and the magnetic disk control device 2A, however, must be carried out in accordance with the data formats shown in FIG. 6A and FIG. 7A.

This is because it is necessary for the host device 1 that, even when the disk system is replaced by a new disk system, the data processing must seem to be the same as if it is carried out in accordance with the same format as that for the conventional disk system.

The above-mentioned physical cell number PCN is a physical cell position. The logical cell number LCN is a compatible cell position in order to maintain the compatibility between the host device 1 and the magnetic disk control device 2A. The logical cell number LCN is the same as the cell number CN in the conventional format.

By providing such areas for recording the physical cell number PCN and the logical cell number LCN, the magnetic disk control device 2A can use the logical cell number LCN for the host device 1 to emulate the disk format of the conventional disk track. On the other hand, the data recording position on the actual magnetic disk device or the skip control data for avoiding defects in the magnetic disk device are processed by using the physical cell number PCN.

Also, from the relationship between the physical cell number PCN and the logical cell number LCN, the data capacity (track capacity) for a possible storage per one track can be virtually emulated.

Next, a disk track emulation system and method according to the embodiment of the present invention is explained, but first is summarized as follows.

When data is to be written to the disk, first a basic format must be prepared with respect to the data format of the disk track. The preparation of the basic format is an initialization process of the data format.

The initialization of the data format of the disk track is made by writing the home address HA and the record $R_0$ (track description record) to the disk. When the initialization process is to be carried out, first a command (CCW) is sent from the host device 1 to the magnetic disk control device 2A. The command (CCW) can be any of "SEEK", "SET FILE MASK", "DIAGNOSTIC WRITE HA", and "WRITE $R_0$"

Based on these commands, the magnetic disk control device 2A controls the magnetic disk device 3A to carry out the initialization process.

When data records $R_1$ to $R_n$ are to be added to the record $R_0$ prepared in the above-mentioned initialization process, a sequence of commands consisting of "SEEK", "SET FILE MASK", "SEARCH ID EQ", and "WRITE CKD" is sent from the host device 1 to the magnetic disk control device 2A.

The magnetic disk control device 2A, which has received the above-mentioned commands "SEEK" and "SET FILE MASK" from the host device, outputs an instruction to the magnetic disk device 3A to position the head of the magnetic disk device 3A at the target track.

After recognition of the completion of the positioning by the magnetic disk device 3A, the magnetic disk control device 2A receives the command "DIAGNOSTIC WRITE HA" from the host device 1. The data sent from the host device 1 at this time has the conventional format shown in FIG. 6A. Namely, the data sent from the host device 1 has a format compatible with the conventional format. Therefore, the skip control SC (the damaged position data) in the data from the host device 1 is written by the physical cell position number.

The data shown in FIG. 6A, sent from the host device 1 to the magnetic disk control device 2A, is first stored in the transfer buffer 6. The current writing position is set as the physical cell position data PCN and the logical cell position data LCN. The same PCN and LCN values are also stored in the internal register group 9.

At this time also, damaged position data is stored in the internal register group 9 to be used for correcting, in the following data writing operation, the writing positions with respect to the damaged positions.

Thereafter, the physical cell position data PCN is added to the data sent from the host device 1 and stored in the transfer buffer 6. The added data is then sent from the transfer buffer 6 to the magnetic disk device 3A, and is written on the disk track of the magnetic disk device 3A.

Then, preparation for the next writing is carried out by adding the number of cells of the home address, i.e., 2, to the PCN and to the LCN. Note that, when there a defect is found in the disk track during the above-mentioned data writing operation, a process is carried out to correct the physical cell position data PCN.

In response to the "WRITE Re" command issued next from the host device 1 to the magnetic disk control device 2A, data is written in the count area and the data area in the record $R_0$ in accordance with the new data format. Before writing the data in the count area, as a first preparation for writing, the number of cells, i.e., 9, in the gap between the cells 23 and 31, i.e., between the home address and the record $R_0$, is added to the values of the PCN and LCN.

By using the values of the corrected PCN and LCN values, the data is written in the count area, and then a value for the gap between the cells 34 and 42 is added to the PCN and LCN. Then, by using these corrected values of the PCN and LCN, data is written in the data area.

Thereafter, the number of cells in the written data area and in the gap between the cells 44 and 51 are added to the values of the PCN and the LCN for preparing the next writing operation.

Next, to detect a quasi-index position at the end of the track, the following process is carried out. Namely, when an attempt is made to write data up to the physical end (the position of the index mark, i.e., 1944) of the new data format in the new disk track, conventionally, an error referred to as "INVALID TRACK FORMAT" is detected because the write position exceeds the physical index (1554) of the conventional disk track. Namely, since the actual track capacity of the new track is larger than the logical capacity, data having a data format which is longer than that to be emulated is written when the physical index of the new disk track is used.

In the disk track emulation method according to the present invention, to avoid the excessive writing, a logic index is generated.

This is done by adding a data length (the number of cells) of the data to be written and a gap length (the number of cells) followed by the data area to the LCN. The data length and the gap length are included in the data of the count area sent from the host device when the data is to be written. If the corrected LCN exceeds the position of the physical index in the conventional data format, the data writing operation is not carried out and the host device 1 is informed of an error.

In the following, based on the process flowcharts shown in FIG. 8 to FIG. 11, the disk track emulation method according to the above-described embodiment is described in detail. Note, steps S1 to S41 in the figures are shown in the description within brackets.

First, a command (CCW) "SEEK" and a command "SET FILE MASK" (CCW) is sent from the host device 1 to the magnetic disk control device 2A, to position the head at the target track on the magnetic disk device 3A.

This command is first stored in the data frame register 5, and then incorporated into the MPU 10. In the MPU 10, a process is carried out by using a program in the control storage 11. When the MPU 10 receives the commands "SEEK" and "SET FILE MASK", the track to be processed is determined (S1).

Thereafter, from the bus register 7 to the target magnetic disk device 3A, a selection instruction is output (S2). Then, when an instruction for positioning the head at the target track is issued from the bus register 7 (S3), the magnetic disk device 3A and the host device 1 are separated (S4).

In this state, the positioning operation is performed by the magnetic disk device 3A only. After completion of the positioning, the magnetic disk control device 2A receives an interruption indicating the completion of the positioning, from the magnetic disk device 3A (S5), whereby the magnetic disk device 3A and the host device 1 are again combined (S6).

Thereafter, when the completion of the positioning from the magnetic disk device 3A is acknowledged by the MPU 10 in the magnetic disk control device 2A, the MPU 10 receives a chain command (CCW) from the host device 1 (S7), and depending on the type of command, the following processes are carried out.

When the above-mentioned command is "DIAGNOSTIC WRITE HA", a process as shown in FIG. 9 is carried out. In FIG. 9, the magnetic disk control device 2A, which has received the above-mentioned command, then receives from the host device 1 data to be written on the magnetic disk device 3A (S8).

The data to be written is in the conventional data format of the home address HA shown in FIG. 6A (i.e., SC, LCN, PA, F, CC, and HH). The data consists of a part (a) in the new data format shown in FIG. 6B, and is temporarily stored in the transfer buffer 6.

Then the MPU 10 sets the physical cell number PCN to 20 and the logical cell number LCN to 14 in the transfer buffer 6 (S9).

In the disk track emulation method according to the present invention, the host device 1 can normally access the disk device by the logical cell position in the conventional data format. However, when the skip control SC is used only, the skip control SC (damaged position data) in the active format shown in FIG. 6A is sent as a physical cell position from the host device.

The value of the PCN is 20, which is the cell number just before the home address shown in FIG. 3B, and the value of the LCN is 14, which is just prior to the home address HA shown in FIG. 3A.

Next, the same values as the PCN and LCN set in the transfer buffer 6 are also set in the physical cell number register (PCN register) 12 and the logical cell number register (LCN register) 13 in the internal register group 9 (S10).

Thereafter, among the data stored in the transfer buffer 6, seven skip controls SC (SC data) are stored in the skip control register (SC register) 14. Note, this embodiment records up to seven SC data per track. SC data higher than seven cannot be recorded and the track is treated as unusable. Therefore, as there is a maximum of seven SC data, seven SC registers 14 are used.

Then, by checking the above-mentioned skip control data, it is determined whether or not there is a damaged position (S12).

Namely, the MPU 10 determines whether or not a defect has been written as the skip control SC sent from the host device 1. If there is a defect (S13), the MPU 10 sends an instruction, through the bus register 7 to the magnetic disk device 3A, to skip three cells for one defect (S14).

Thus, the value of the PCN set in the transfer buffer 6 and the value of the PCN set in the PCN register 12 are modified so that they have values in which the number of three cells is added for one defect to each value (if there is one defect, +3 is added to the PCN; if there are two defects, +6 is added) (S15). In this case, the value of the logical cell number LCN is not changed (because the logical cell position is not influenced by the data of the defect). Also, if there is no defect, the above-mentioned processes S14 and S15 are not carried out.

Following the above, an instruction for writing the home address HA is issued from the MPU 10 to the magnetic disk device 3A, and the data in the transfer buffer 6 is sent through the bidirectional control interface (BCI) 8A (S16). Then, to change the values in the physical cell number register 12 and the logical cell number register 13 to the value at the last portion of the home address HA, for preparing the next process, two is added to these values PCN and LCN, because the number of cells in the home address HA is two (S17).

When the command from the host device 1 is "SEARCH ID EQ", the process shown in FIG. 10 is carried out. In FIG. 10, after receiving the command "SEARCH ID EQ", the magnetic disk control device 2A receives, from the host device 1, 5 bytes data to be searched. The 5 bytes data is stored in the transfer buffer 6 (S18).

This 5 bytes data is the data (CC, HH, and R) in the part (b) in the new format of the counter area shown in FIG. 7B. The data of the part (b) is included in the conventional format shown in FIG. 7A, and therefore, is sent from the host device 1 for a comparing of data.

Next, the MPU 10 issues a command to read the first count area (S19), to the magnetic disk device 3A, and the data read from the count area is stored in the transfer buffer 6 (S20), and the data in the transfer buffer 6 is stored in the internal register group 9 (S21). Then, the above-mentioned 5 bytes data sent from the host device 1 and the 5 byte data read from the count area in the magnetic disk device 3A are compared (S22).

As a result, if they do not coincide (S23), it is necessary to change the values in the physical cell number register 12 and the logical cell number register to the values at the beginning of the next count area. To this end, the number of cells corresponding to the current data area is added to the values in the physical cell number register 12 and the logical cell number register 13 (S24).

Then, an instruction to read the next count area by skipping the data area is issued (S25), and the above-described processes (S20 to S24) are repeated.

In the above-described comparison process (S23), if the values coincide, the host device is informed that the search condition is satisfied, and then, to change the values in the physical cell number register 12 and the logical cell number register 13 to the last part of the count area, two is added thereto (S26), because the number of cells in the counter area is two.

Figure 11:
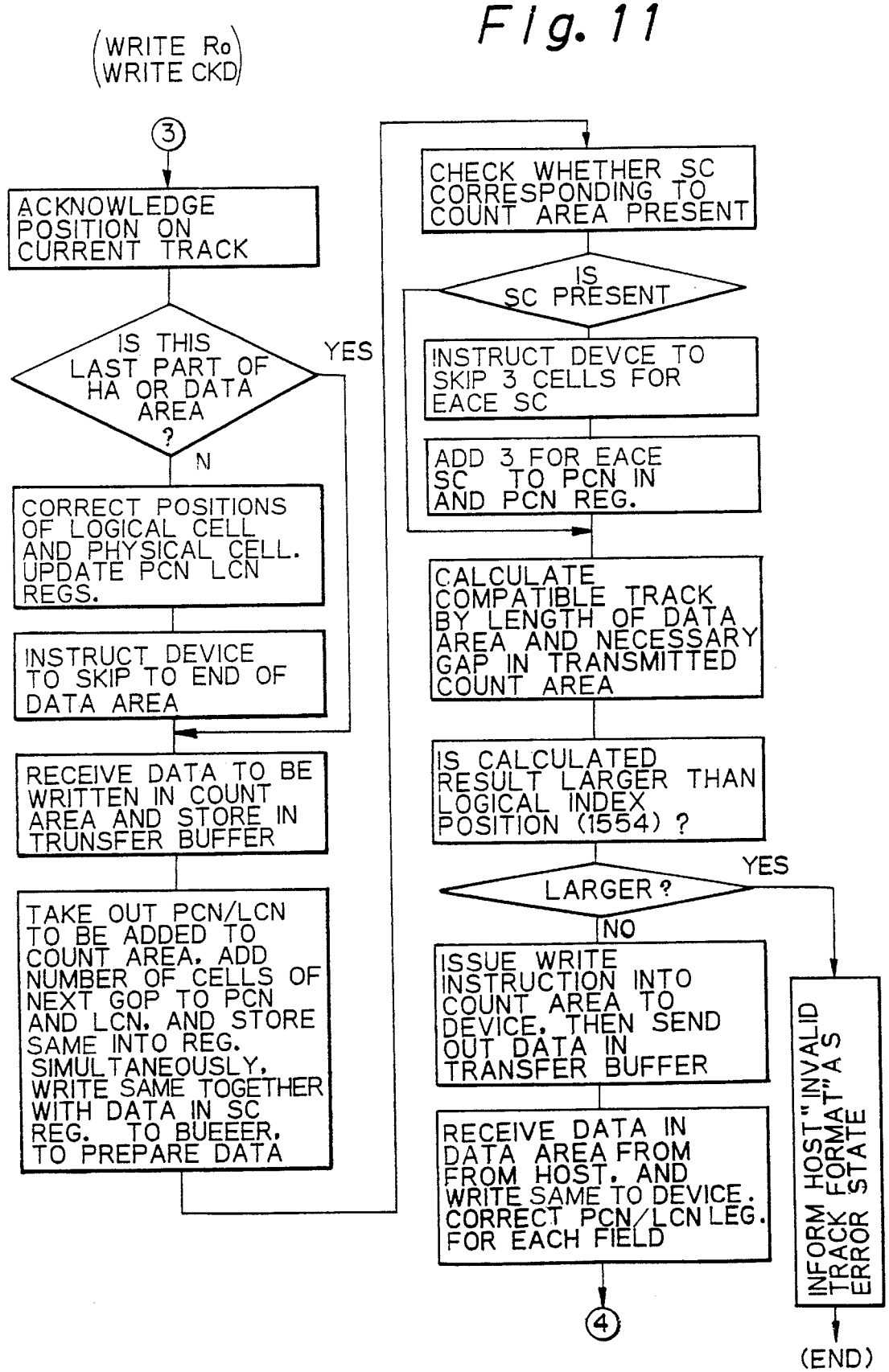

When the command from the host device 1 is "WRITE R0" or "WRITE CKD", a process is carried out as shown in FIG. 11.

First, the magnetic disk control device 2A, which has received the above-mentioned command, recognizes the position at the current track (S27) to determine whether or not the position at the current track is on the last part of the home address HA or of the data area (S28).

As a result, if it is not at the last part, the values of the logical cell number and the physical cell number are corrected to the last part of the data area, by adding to the PCN and the LCN the length of the data area of the previous record and the gap followed by the data area.

Also, at this time, the value of each register (PCN register and the LCN register) is updated to be the same as the last part of the data area (S29).

Then, the MPU 10 issues an instruction to the magnetic disk device 3A to skip to the end part of the data area (S30).

In the judgment at step S28, when the position of the current track is determined to be at the last part of the home address HA or of the data area (S28), the magnetic disk control device 2A receives data to be written into the count area from the host device 1, and stores the data to the transfer buffer 6.

The data received at this time is the data of the part (c) (CC, H, R, KL, and DL) in the new format of the count area shown in FIG. 7B. The data of the part (b) is included in the conventional format shown in FIG. 7A, and therefore, is sent from the host device 1 for a comparing of data.

Thereafter, the physical cell number PCN and the logical cell number LCN, which are to be added to the count area, are taken out from the registers 12 and 13, and then the number of cells in the next gap after the home address or the data area is added to the PCN and the LCN taken out from the registers 12 and 13, and the corrected PCN and LCN are stored in the registers 12 and 13. Simultaneously, to prepare data to be written in the count area, the corrected PCN and LCN are written, with the data in the skip control register 14, to the transfer buffer 6 (S32).

Then, the MPU 10 checks whether or not skip control data (SC data) corresponding to the count area exists (S33). If SC data exists, an instruction to skip 3 cells for each defect is issued to the magnetic disk device 3A.

Then, the PCN in the transfer buffer 6 and the value in the physical cell number register 12 are updated by adding the number of skipped cells (S36).

Next, the length of the data area included in the transferred count area, and the necessary gap, are calculated as a compatible track, to output the logical cell number of the last part in the data area (S37), and it is determined whether or not the calculated result is larger than the position of the logical index (in this example, as shown in FIG. 5, it is 1554) (S38).

As a result, if larger, the limit for writing has been reached, and thus the host device 1 is informed of "INVALID TRACK FORMAT" as an error state (S42).

If it is not larger, the writing limit has not been reached and a write instruction of the count area is issued to the magnetic disk device 3A, whereby the data in the transfer buffer 6 is sent to the magnetic disk device 3A (S40).

Then, the data in the data area is received from the host device 1 and is written to the magnetic disk device 3A. At this time, corrections are made for each field, by writing the values of the PCN and the LCN into the physical cell number register 12 and the logical cell number register 13 (S41).

In this case also, similar to the above-described count area, the correction due to the defect is carried out based on the SC data.

As described above, according to the present invention, the following effects are obtained.

(a) In a computer system, when a disk system is replaced by a new disk system having a different data format from the conventional data format in the conventional disk system, the compatibility of the data formats can be maintained, and therefore, it can be used in the same way as in the a drive system without reforming programs and so forth in the host device.

(b) When the disk systems are exchanged, since it is not necessary to reform the programs and so forth in the host device, less time and labor are required.

(c) Even when the data format of the disk track is modified, the user's resources are not wasted.

What is claimed is:

1. A disk track emulation system for making a first variable track length data format used by a host device compatible with a second variable track length data format used by a disk device;

said first data format including cells each consisting of n bytes, N number or cells being on a circumferential track of the first data format;

said second data format including cells each consisting of m bytes, M number of cells being on one circumferential track of the second data format;

wherein N is unequal to M and n is unequal to m;

said system comprising:

said host device, said disk device, and a disk control device connected between said host device and said disk device;

said disk device including at least one disk track having a plurality or cells, each of said cells having a certain number of bytes;

said host device handling data in accordance with said first data format, and said disk control device and said disk device handling data in accordance with said second data format;

said disk control device comprising:

physical cell position data generating means for generating physical cell position data representing a track position and a record position of a cell to be accessed in accordance with said second data format using said M cells and said m bytes, in response to accessing operations by said host device, said disk control device, and said disk device;

logical cell position data generating means for generating logical cell position data representing a track position and a record position of the cell to be accessed in accordance with said first data format using said N cells and said n bytes; and said disk control device storing said physical cell position data and said logical cell position data on said disk track in accordance with said second data format.

2. A disk track emulation system as claimed in claim 1, wherein said track on said disk device includes a home address area for recording home address data for indicating at least the position of the track, and a count area provided for each record in said track for indicating the physical position of the record, said physical cell position data and said logical cell position data being written in both said home address area and said count area.

3. A disk track emulation system as claimed in claim 2, wherein a determination by said disk control device of damaged position data on said disk device causes an adjustment to said physical cell position data while said logical cell position data is held constant.

4. A disk track emulation system as claimed in claim 1, wherein:
control of said disk device is carried out by using said physical cell position data; and
a transfer of data to said host device is carried out by using said logical cell position data.

5. A disk track emulation system as set forth in claim 4, further comprising:
checking means for checking damaged position data transferred, as the physical cell position data, from said host device during writing of data into a disk track;
writing means for writing the data, and for skipping the writing position on the disk track by a predetermined number of cells when a defect exists at a data writing position, based on said damaged position data; and
adding means for adding the number of cells for said skipping to the physical cell position data indicating the current position on the disk track while said logical cell position data is held constant;
whereby the position of the defect is corrected.

6. A disk track emulation system as set forth in claim 4, further comprising:
take out means for taking out length data of data to be written included in the count area sent from the host device during an attempted write definition by the host device; and
adding means for adding the number of cells specified by the length data and the number of cells of a gap thereafter to the current logical cell position data to calculate a final logical cell position of the data to be written;
said disk control device informing said host device of an error and halting the write operation when the final logical cell position exceeds the cell position of a physical index indicating the end of a physical track in the first data format.

7. A disk track emulation system in a disk control device, for maintaining compatibility between different data formats, said system comprising:
said disk control device connected between a host device and a disk device;
said host device handling data in accordance with a first variable track length data format, and said disk control device and said disk device handling data in accordance with a second variable track length data format, said second data format different from said first data format;
said first data format including cells each consisting of n bytes, N number of cells being on one circumferential track of said first data format;
said second data format including cells each consisting of m bytes, M number of cells being on one circumferential track of said second data format;

wherein N is unequal to M and n is unequal to m;
the data in accordance with said first data format including, for each track to be emulated, a first home address indicating at least a logical position of the track and a first count area indicating at least a logical position of a record in the track,
the data in accordance with said second data format including, for each track on said disk device a second home address indicating at least a physical position of the track on said disk device and a second count area indicating at least a physical position of a record in the track,
wherein:
said second data format further including a physical cell position data including the physical cell position of a track and a record on said disk device to be accessed, and a logical cell position data used in said host device and indicating the logical cell position of a track and a record on said disk device to be accessed and corresponding to said physical cell position.

8. A disk track emulation method for maintaining a compatibility of a variable length data format of a new disk track with a conventional variable track length data format, by using a new disk track device having disk tracks with a data format different from that of a conventional disk device, and by means of a disk control device for controlling the new disk device, wherein:
using the characteristics that said data formats are divided by a unit called a cell, said conventional data format cells and said different data format cells having a constant and unequal number of bytes;
said conventional data format including cells each consisting of n bytes, N number of cells being on one circumferential track of said conventional data format;
said different data format including cells each consisting of m bytes, M number of cells being on one circumferential track of said different data format;
wherein N is unequal to M and n is unequal to m; and
writing, into both a home address area and a count area in the new data format, track and record cell position data with the different data format, and compatible track and record cell position data with respect to the active data format in which the compatibility should be maintained, whereby the compatibility of the data format is maintained.

9. A disk track emulation method as set forth in claim 8, wherein:
using a physical cell position data as said cell position data of the new data format;
using as said compatible cell position data a logical cell position data determined, without influence by damaged position data, in accordance with the active data format;
processing, during the control of a disk device, by using said physical cell position data; and
transferring data to the host device by using said logical cell position data.

10. A disk track emulation method as set forth in claim 9, wherein:
checking damaged position data transferred, as physical cell position data, from the host device while writing data to a disk track;
writing data, when a defect exists at a data writing position, by skipping the writing position on the disk track by a predetermined number of cells, based on said damaged position data; and adding the number of cells to be skipped, to the physical cell position data indicating the current position on the disk track while holding the logical cell position data constant; whereby the physical position data is corrected with respect to the damaged position.

11. A disk track emulation method as set forth in claim 9 or 10, wherein:

taking out, from data in a proposed write operation on the disk track, written-data length data included in the count area sent from the host device; and adding the number of cells of the data area of this data and the number of cells of a gap thereafter to the logical cell position data to calculate the position of the last logical cell for said data to be written and for informing the host device of an error and halting the write operation when the last logical cell exceeds the cell position of a physical index, thus indicating the end of the end of the physical track in the active format.

12. A disk track emulation system for making a first variable track length data format used by a host device compatible with a second variable track length data format used by a disk device;

said first data format including cells each consisting of n bytes, N number of cells being on a circumferential track of the first data format;

said second data format including cells each consisting of m bytes, M number of cells being on one circumferential track of the first data format;

said m number being different than said n number;

said system comprising:

said host device, said disk device, and a disk control device with a physical cell position register in which physical cell position information is stored, and an aligned cell position register in which logical position information is stored connected between said host device and said disk device;

said disk device including at least one disk track having a plurality of cells, each of said cells having a certain number of bytes;

said host device handling data in accordance with said first data format, and said disk control device and said disk device handling data in accordance with said second data format;

said disk control device comprising:

physical cell position data generating means for generating physical cell position data representing a position of a track and a record of a cell to be accessed in accordance with said second data format using said physical cell position data in said physical cell position register, in response to accessing operations by said host device, said disk control device, and said disk device;

logical cell position data generating means for generating logical cell position data representing a position of a track and a record of the cell to be accessed in accordance with said first data format using said logical cell position data in said logical cell position register; and said disk control device storing said physical cell position data and said logical cell position data on said disk track in accordance with said second data format.

13. A disk track emulation system as claimed in claim 12, wherein said track on said disk device includes a home address area for recording home address data for indicating at least the position of the track, and a count area provided for each record in said track for indicating the physical position of the record, said physical cell position data and said logical cell position data being written in said home address area and said count area.

14. A disk track emulation system as claimed in claim 13 wherein a determination by said disk device of damaged position data on said disk device causes an adjustment to said physical cell position data while said logical cell position data is held constant.

15. A disk track emulation system as claimed in claim 12, wherein:

control of said disk device is carried out by using said physical cell position data; and a transfer of data to said host device is carried out by using said logical cell position data.

16. A disk track emulation system as set forth in claim 15, further comprising:

checking means for checking damaged position data transferred, as the physical cell position data, from said host device during writing of data into a disk track;

writing means for writing the data, and for skipping the writing position on the disk track by a predetermined number of cells when a defect exists at a data writing position, based on said damaged position data; and adding means for adding the number of cells for said skipping to the physical cell position data indicating the current position on the disk track while said logical cell position data is held constant;

whereby the position of the defect is corrected.

17. A disk track emulation system as set forth in claim 15, further comprising:

take out means for taking out length data of data to be written included in the count area sent from the host device during an attempted write definition by the host device; and adding means for adding the number of cells specified by the length data and the number of cells of a gap thereafter to the current logical cell position data to calculate a final logical cell position of the data to be written;

said disk control device informing said host device of an error and halting the write operation when the final logical cell position exceeds the cell position of a physical index indicating the end of a physical track in the first data format.

18. A disk track emulation method for maintaining a compatibility of a variable length data format of a new disk track with a variable track length conventional data format, by using a new disk track device having disk tracks with a data format different from that of a conventional disk device, and by means of a disk control device with a physical cell position register in which physical track and record cell position information is stored, and logical cell position register in which logical track and record cell position information is stored for controlling the new disk device, said emulation method using the characteristics that said data formats are divided by a unit called a cell, said conventional data format cells and said different data format cells having a constant and unequal number of bytes;

said conventional data format including cells each consisting of n bytes, N number of cells being on one circumferential track of said conventional data format;

said different data format including cells consisting of m bytes, M number of cells being on one circumferential track of said different data format;

wherein N is unequal to M and n is unequal to m; and writing, into both a home address area and a count area in the different data format, cell position data with the new data format, and compatible cell position data with respect to the active data, whereby the compatibility of the data is maintained.

19. A disk track emulation system as set forth in claim 5, further comprising:

take out means for taking out length data of data to be written included in the count area sent from the host device during an attempted write definition by the host device; and adding means for adding the number of cells specified by the length and the number of cells of a gap thereafter to the current logical cell position data to calculate a final logical cell position of the data to be written;

said disk control device informing said host device of an error and halting the write operation when the final logical cell position exceeds the cell position of a physical index indicating the end of a physical track in the first data format.

20. A disk track emulation system as set forth in claim 16, further comprising:

take out means for taking out length data of data to be written included in the count area sent from the host device during an attempted write definition by the host device; and adding means for adding the number of cells specified by the length data and the number of cells of a gap thereafter to the current logical cell position data to calculate a final logical cell position of the data to be written;

said disk control device informing said host device of an error and halting the write operation when the final logical cell position exceeds the cell position of a physical index indicating the end of a physical track in the first data format.

* * * * *

UNITED STATES PATENT AND TRADEMARK OFFICE
CERTIFICATE OF CORRECTION

PATENT NO. : 5,590,311
DATED : December 31, 1996
INVENTOR(S) : Matsushima

It is certified that error appears in the above-indentified patent and that said Letters Patent is hereby corrected as shown below:

Column 16, line 46, delete "or" and insert

--of--.

Signed and Sealed this

Twenty-eighth Day of October, 1997

Attest:

BRUCE LEHMAN

Attesting Officer

Commissioner of Patents and Trademarks